United States Patent [19]  [11] 4,029,847
Imagawa et al.  [45] June 14, 1977

[54] COATING COMPOSITION FOR POLYESTER RESIN CONTAINING CELLULOSIC MATERIAL AND POLYOL-DIISOCYANATE REACTION PRODUCT

[75] Inventors: Tadao Imagawa; Noriyuki Endo, both of Fujimiya, Japan

[73] Assignee: Fuji Photo Film Co., Ltd., Minami-ashigara, Japan

[22] Filed: Mar. 15, 1976

[21] Appl. No.: 667,065

Related U.S. Application Data

[62] Division of Ser. No. 501,580, Aug. 29, 1974, Pat. No. 3,984,492.

[30] Foreign Application Priority Data

Aug. 29, 1973 Japan .............................. 48-97051

[52] U.S. Cl. .................................. 428/425; 260/13; 428/480
[51] Int. Cl.$^2$ .................... B32B 27/40; C08L 1/12; C08L 1/14; C08L 1/18
[58] Field of Search ............. 260/13; 428/423, 425, 428/480

[56] References Cited

UNITED STATES PATENTS

| | | | |
|---|---|---|---|
| 3,380,950 | 4/1968 | Blomeyer | 260/13 |
| 3,763,061 | 10/1973 | Lewis | 260/13 |
| 3,816,168 | 6/1974 | Lewis | 260/13 |
| 3,823,102 | 7/1974 | Eimer et al. | 260/13 |

*Primary Examiner*—Edward M. Woodberry
*Attorney, Agent, or Firm*—Sughrue, Rothwell, Mion, Zinn & Macpeak

[57] ABSTRACT

A coating composition for a polyester resin which comprises (1) at least one of a cellulosic high molecular weight material, a homo- or copolymer of chlorinated ethylene as a monomer component, a homo- or copolymer of methacrylate or acrylate as a monomer component, a homo- or copolymer of vinylidene chloride as a monomer component, a polycarbonate, an ethylene-vinyl acetate copolymer, a polyvinyl butyral, a cyclized rubber and a styrene-butadiene rubber and (2) an addition reaction product of a polyol and a diisocyanate.

7 Claims, No Drawings

COATING COMPOSITION FOR POLYESTER RESIN CONTAINING CELLULOSIC MATERIAL AND POLYOL-DIISOCYANATE REACTION PRODUCT

This is a division of application Ser. No. 501,580, filed Aug. 29, 1974, now U.S. Pat. No. 3,984,492.

BACKGROUND OF THE INVENTION

1. Field of the Invention

The present invention relates to coating compositions for polyester resins.

2. Description of the Prior Art

Polyester resin films and particularly polyethylene terephthalate films have excellent properties such as good physical strength, good heat resistance, good gas-impermeability and good electrical properties, etc. However, polyester resin films have defects in that they are not heat-sealable and they are difficult to write or print on.

Hitherto, a certain synthetic resin layer has been provided on polyester resin films in order to remove these defects. For example, a vinylidene type polymer layer is formed on a polyester resin film to improve the gas-impermeability and to render the film heat sealable, whereby the film can be used for heat sterilization packing or vacuum packing of foods. Further, a polyester resin film having a layer containing a matting agent or a bulking agent therein is used as a tracing film or a scribing film. However, in the case of providing a synthetic resin layer on the polyester resin film, an activation treatment such as a corona discharge treatment, ultraviolet light exposure or a flame treatment, etc. of a surface of the base film is applied in order to obtain firm adhesion in addition to the formation of a subbing layer thereon. However, these treatments are not very effective for polyester resin films. Furthermore, a method which comprises dipping the polyester resin films in an aqueous acid or alkali solution and a method which comprises dipping the polyester resin films in trichloroacetic acid or phenols have been considered. However, these methods are not suitable, because the handling of chemicals is dangerous because of their toxicity, and after the treatment the treating solution remaining in the base film due to permeation excludes as time passes adversely influencing the synthetic resin coating layer or injuring the appearance of the product. Accordingly, at present, an adhesive layer, a socalled subbing layer, is usually provided on a polyester film where such is to be coated with a synthetic resin layer.

SUMMARY OF THE INVENTION

As a result of studies on a coating layer for use in providing a synthetic resin layer on a polyester resin base, a novel effective coating composition has been found, and thus the present invention has been attained.

The present invention provides a coating composition for a polyester resin which comprises (1) at least one of a cellulosic high molecular weight material, a homopolymer or copolymer of chlorinated ethylene as a monomer component, a homo- or copolymer of methacrylate or acrylate as a monomer component, a homo- or copolymer of vinylidene chloride as a monomer component, a polycarbonate, an ethylene-vinyl acetate copolymer, polyvinyl butyral, a cyclized rubber and a styrene-butadiene rubber and (2) an addition reaction product of a polyol and a diisocyanate, wherein a weight ratio of component (2) to component (1) is above about 10%.

DETAILED DESCRIPTION OF PREFERRED EMBODIMENTS

Examples of cellulosic type high molecular weight materials as component (1) of the present composition are nitrocellulose, cellulose acetate and cellulose acetate butyrate which are easily available. Suitable examples of polymers of chlorinated ethylene or vinylidene chloride as a monomer component are polyvinyl chloride, copolymers of vinylidene chloride and vinyl acetate, copolymers of vinyl chloride and acrylate, polyvinylidene chloride, copolymers of vinyl chloride and vinylidene chloride, copolymers of vinylidene chloride and acrylonitrile and copolymers of vinylidene chloride and acrylate. Illustrative acrylate or methacrylate polymers as the monomer component are polyacrylic acid esters in addition to the above described acrylate polymers as a monomer component. Examples of acrylates and methacrylates include the methyl ester, ethyl ester, n-propyl ester and n-butyl ester, etc. Furthermore, as component (1) of the composition of this invention, polycarbonates, ethylene-vinyl acetate copolymers, polyvinyl butyral, cyclized rubber and styrene-butadiene rubber can be employed.

More specifically, a suitable degree of nitration of the cellulose derivative can range preferably from about 7 to 15 mol % and a suitable degree of acylation can range preferably from about 15 to 50 mol%. A suitable proportion of chlorinated ethylene in the copolymers of chlorinated ethylene is at least about 20% chlorinated ethylene and in particular a suitable copolymer comprises about 20 to 50 mol % chlorinated ethylene and about 80 to 50 mol % ethylene. A suitable proportion of the copolymers containing methacrylate or acrylate is at least about 10 to 20 mol % of the methacrylate or acrylate and in particular a suitable copolymer comprises about 10 to 80 mol % methylmethacrylate and about 90 to 20 mol % ethylacrylate. Copolymers containing vinylidene chloride as a monomer compound can suitably contain at least about 20 mol % vinylidene chloride and in particular a suitable copolymer comprises about 20 to 40 mol % vinylidene chloride and about 80 to 10 mol % of acrylonitrile, of ethylacrylate or of vinyl chloride. A suitable molar ratio for the ethylene-vinyl acetate copolymers ranges from about 60 to 85, preferably 65 to 80, mol % ethylene and about 15 to 40, preferably 20 to 35, mol % vinyl acetate. For the styrene-butadiene rubber a suitable molar ratio ranges from about 10 to 30 mol % butadiene and about 90 to 70 mol % styrene.

Of these polymers, the homo- and copolymers of a halogenated monomer such as vinyl chloride or vinylidene chloride are most preferred.

On the other hand, component (2) is an addition reaction product of a polyol and a diisocyanate. Examples of polyols (e.g., compounds having at least two hydroxyl groups in the molecule and having 2 to 10 carbon atoms) include ethylene glycol, propylene glycol, 1,4-butanediol, 1,2-butanediol, 1,5-pentanediol, 1,6-hexanediol, 1,7-heptanediol, dimethylolcyclohexane, xylylenediol, 1,8-octanediol, 1,9-nonanediol, 1,10-decanediol and resorcinol as dihydric polyols, and glycerine, trimethylolpropane, trimethylolethane, trimethylol-iso-butane, trimethylolhexane, 1,2,4-butanetriol, 1,2,6-hexanetriol and pentaerythritol as tri- or polyhydric polyols. Examples of diisocyanates (e.g., compounds of the general formula OCN-R-NCO, wherein R represents a divalent aliphatic or aromatic hydrocarbon group) include 2,4-tolylenediisocyanate, 4,6-tolylenediisocyanate, meta-xylylenediisocyanate, p-xylylenediisocyanate, 1,5-naphthylenediisocyanate, 1,6-hexamethylenediisocyanate, methylene-bis-(p-phenylene)-diisocyanate, decamethylenediisocyanate, phenylenediisocyanate and dimethyldiphenylenediisocyanate, etc. These compounds are well known in the art and are described, for example, in U.S. Pat. Nos. 3,135,716, 3,261,655, 3,281,383, 3,468,922, 3,773,695, 3,773,376, 3,775,427, 3,775,441, 3,781,320, and 3,793,268, etc. In addition, isocyanate terminated polyurethanes such as the reaction product of three moles of toluenediisocyanate with one mole of trimethylol propane can also be used.

The addition reaction of the polyol and the diisocyanate can be carried out using known techniques.

Of these addition reaction products, those products produced by using an equivalent ratio of about 1:0.5 to 1:2 and preferably 1:1 of the diisocyanate per hydroxyl group of the polyol are particularly effective. It is believed the reason for this is that residual isocyanate groups increase chemical affinity or induce chemical bonding thereby resulting in the effect of the present invention and urethane bonds in the molecule remarkably enhance the effect.

The reaction of these materials is described in detail in U.S. Pat. Nos. 2,284,896 and 2,430,479 and in the literature, e.g., Imoto et al, Gosei Kobunshi V, 309–363, Asakura Shoten, Tokyo (1971) and in Matsudaira, Polyurethane Maki, Tokyo (1968).

The addition reaction product (2) produced is mixed with the component (1) in a ratio of 10% (by weight) or higher, e.g., up to about 500% (by weight) based on the weight of component (1). Usually, these components are mixed as a solution in an organic solvent. In this case, a solution of component (1) and a solution of component (2) can be mixed or component (1) and component (2) can be dissolved in an organic solvent such as ethyl acetate, methylcellosolve acetate, cellosolve acetate, methoxybutyl acetate, methyl ethyl ketone, cyclohexanone, methylene chloride, trichloroethylene, etc. The organic solvent used can be chosen depending on the kind of component (1) or component (2) such that both components are soluble. For example, ethyl acetate or methanol can be used for nitrocellulose; acetone, methylene chloride or methanol for cellulose acetate; methylene chloride, methyl ethyl ketone, tetrahydrofuran or methanol for cellulose acetate butyrate; ethyl acetate or toluene for vinyl chloride-acrylic acid ester copolymers; and methyl ethyl ketone or toluene for vinylidene chloride-acrylonitrile copolymers. These can be easily chosen depending on the purpose one skilled in the art.

In the case of mixing solutions of such organic solvents, a solution containing about 5 to 20% (by weight) of the materials excluding the isocyanate component is prepared. Then a solution containing the isocyanate component in the amount of about 10 to 500% (by weight) based on the solids content of the above organic solution of the other components is added as, for example, a 75% by weight ethyl acetate solution to the above solution. A particularly good result can be obtained when an amount of 100 to 300% (by weight) is used.

The coating composition for the polyester resin of the present invention can contain an antistatic agent, e.g., in an amount of about 2 to 10% (by weight) based on the weight of the polymers solids, such as an alkyl sulfonate, an alkylamine or a quaternary ammonium salt, or a matting agent, e.g., in an amount of about 50 to 300% (by weight) based on the weight of the polymer solids, such as silicon dioxide, clay or aluminum oxide to provide a composition with the ability to be written upon.

When the compositions are applied to the polyester resin film, although the thickness of the coating layer can be varied widely depending on the purpose, good results can be obtained by forming a coating layer having a thickness of about 0.5 to 25 $\mu$ and particularly, a thickness of 5 to 10 $\mu$.

As described above, according to the present invention the primer composition of the invention can be applied to the polyester resin base without any previous treatment of the base being carried out, when a high molecular weight coating layer is formed on the polyester resin base, and strong adhesion is obtained between the polyester resin base and the high molecular weight coating layer. Further, the present invention has many advantages in that curling does not occur even if the polyester resin base is a film, in that deterioration of the properties of the coating layer on the base is not observed with the lapse of time, in that toxic materials are not generated and in that the production thereof can be carried out inexpensively. Accordingly, this invention is very useful.

The polyester resin in the present invention means a polyester of aromatic dibasic acids and glycols as main ingredients. Examples of typical dibasic acids include terephthalic acid, isophthalic acid and naphthalenedicarboxylic acid, etc. Examples of glycols include ethylene glycol, propanediol and butanediol, etc. Of these polyester resins, polyethylene terephthalate is most preferred because of its ready available. The degree of streching which can be suitably employed ranges from about 300 to 500% in the longitudinal direction and from about 300 to 500% in the transverse direction.

The present invention is illustrated in detail in the following examples. Unless otherwise indicated all parts, percents, ratios and the like are by weight. In the examples, the following crosscut test and the following measurement of stripping strength were carried out in order to evaluate the adhesion between the polyester resin film and the coating layer.

1. Cross-cut Test 5 scratch lines in a crosswise direction and in a lengthwise direction at intervals of 5 mm were made on the surface of a coated layer of a sample (which has a layer of the coating composition of the present invention on a polyester resin film) with a razor so as to form a cross-hatched pattern. After a pressure sensitive adhesive tape was adhered to the above described coated surface, the tape was stripped off by drawing the tape off rapidly. The adhesion evaluation was carried out by counting the number of stripped squares on the coated layer. A grade of 0 was assigned where all emulsion squares were stripped off, and a grade of 10 was assigned when no emulsion square was stripped off.

A grade of 10 is necessary for practical use so as to obtain good adhesion.

2. Measurement of Stripping Strength:

A polyester resin film (the thickness of which was the same as that of a polyester resin film of the sample) was superposed on a coating layer of the sample using an epoxy type adhesive. Then, the superposed film was passed through press rolls and allowed to stand in an air constant temperature bath at 50° C for 3 hours to harden the adhesive. After seasoning the sample in an air conditioned room at 23° C and 65% relative humidity for about 16 hours, the sample was removed and a 90° (cross-type) stripping strength was measured using a tensile strength tester. A stripping strength of above 30 g/mm is necessary for practical use so as to obtain good adhesion between the polyester resin film (base) and the coating layer.

EXAMPLE 1

To a biaxially stretched crystalline polyester resin film (thickness: 50 μ), a high molecular weight material solution having the following composition was applied so as to form a coating layer having a dry thickness of 8 μ using a 30 coating rod. After application, the coating layer was dried at 120° C for 10 minutes by heating. Thus, Samples 1 to 5 were produced.

| | |
|---|---|
| Vinylidene Chloride-Acrylonitrile Copolymer Resin (10:90 molar ratio; intrisic viscosity 1.3 to 1.5 as 1% solids concentration in tetrahydrofuran at 25° C; molecular weight about 20,000–50,000) (Component (1)) | 5 g |
| Methyl Ethyl Ketone | 27 g |
| Toluene | 18 g |
| Reaction Product of Trimethylol propane (1 mol)-Tolylenediisocyanate (3 mol) (Component (2)) | as shown in Table 1 |

The above described cross-cut test and measurement of stripping strength were carried out for Samples 1 to 5. The results obtained for each sample are shown in Table 1.

Table 1

| | Sample | | | | |
|---|---|---|---|---|---|
| | 1 | 2 | 3 | 4 | 5 |
| Amount of Component (2) (g) | 0 | 2.5 | 5 | 15 | 25 |
| Ratio of Component (2) based on Component (1) (% by weight) | 0 | 50 | 100 | 300 | 500 |
| Cross-cut Test | 0 | 5 | 10 | 10 | 10 |
| Stripping Test (g/mm) | 15 | 50 | 60 | 40 | 35 |

As is shown in Table 1, the stripping strength of Sample 1 wherein the Component (2) was not added, i.e., having a coating layer composed of only the copolymer resin, is very low. It is clear that such a resin coated polyester resin film can not be used practically. When Component (2) is added in a ratio of 50% (by weight) based on Component (1) (Sample 2), a film which can be used for some uses can be obtained. When Component (1) and Component (2) are used each in an equivalent amount (Samples 3 to 5), the cross-cut test results obtained are good, by which films which can be used for substantially all uses can be obtained. In the cases of Samples 2 to 5, curling occurred rarely and the surface property of the coating layer was very good.

EXAMPLE 2

Resin coating polyester resin films (Samples 6 to 10) were produced in the same manner as described in Example 1 but a high molecular weight material solution having the following composition was used instead of the high molecular weight material solution of Example 1. The preparation of the coating solutions (high molecular weight material solutions) was as follows.

32 g of a 37% (by weight) solution of a vinyl chloride-ethyl acrylate copolymer (50:50 molar ratio; degree of polymerization of about 250 – 400) (Denkalac N-40, trade name, produced by Electro Chemical Industry Co., Ltd.) in a solvent mixture of ethyl acetate-toluene (volume ratio: 1:1) was weighed out. Then an addition reaction product of 1,2,6-hexanetriol (1 mol) and m-xylylenediisocyanate (3 mols) was added thereto in the amounts shown in Table 2 to produce 5 kinds of coating solutions.

The measurement of the stripping strength of Samples 6 to 10 was carried out in the same manner as in Example 1. The results obtained for the samples are shown in Table 2.

Table 2

| | Sample | | | | |
|---|---|---|---|---|---|
| | 6 | 7 | 8 | 9 | 10 |
| Amount of Component (2) (g) | 0 | 2.5 | 5 | 15 | 25 |
| Ratio of Component (2) to Component (1) (% by weight) | 0 | 50 | 100 | 300 | 500 |
| Cross-cut Test | 8 | 10 | 10 | 10 | 10 |
| Stripping Test (g/mm) | 0 | 20 | 30 | 35 | 20 |

EXAMPLE 3

To a biaxially stretched crystalline polyethylene terephthalate film (thickness: 50 μ), a high molecular weight material solution having the following composition was applied using a roll coater so as to have a dry thickness of 8 μ. The resulting coating layer was dried at 120° C for 10 minutes by heating. Thus, Samples 11 to 15 were obtained.

| | |
|---|---|
| Nitrocellulose "RS 1/2 Seconds" (produced by Daisel Ltd., nitration degree: 10.7 – 11.4% by weight; degree of polymerization: about 100 – 300) (Component (1) | 5 g |
| Ethyl Acetate | 22.5 g |
| Methyl Ethyl Ketone | 22.5 g |
| Reaction Product of Trimethylol Propane (1 mol) and Hexanediisocyanate (3 mols) (Component (2)) | Amount shown in Table 3 |

Measurement of the above described cross-cut test and the stripping strength were carried out for Samples 11 to 15. The results obtained for the samples are shown in Table 3.

Table 3

| | Sample | | | | |
|---|---|---|---|---|---|
| | 11 | 12 | 13 | 14 | 15 |
| Amount of Component (2) (g) | 0 | 2.5 | 5 | 15 | 25 |
| Ratio of Component (2) to Component (1) (% by weight) | 0 | 50 | 100 | 300 | 500 |
| Cross-cut Test | 0 | 3 | 5 | 10 | 10 |
| Stripping Test (g/mm) | 0 | 25 | 40 | 20 | 10 |

As is clear from the results in Table 3 above a better result is generally obtained in the cross-cut test if the amount of Component (2) is increased, while a better result is obtained in the stripping test if the amount of Component (2) is about 50 to 300% by weight.

EXAMPLE 4

To a biaxially stretched crystalline polyethylene terephthalate film (thickness: 50 μ), a high molecular weight material solution having the following composition was applied using a 30 coating rod so as to have a dry thickness of 8 μ. The coating layer was then dried at 120° C for 10 minutes by heating.

| | |
|---|---|
| Cellulose Acetate Butyrate "EAB 381-1" (produced by Eastman Kodak Co.; acetyl content: about 13% by weight; butyryl content: about 37% by weight, degree of polymerization: about 200–300) (Component (1)) | 5 g |
| Methylene Chloride | 22.5 g |
| Tetrahydrofuran | 22.5 g |
| Reaction Product of Pentaerythritol (1 mol) and Tolylenediisocyanate (4 mols) (Component (2)) | Amount Shown in Table 4 |

Measurement of the above described cross-cut test and stripping strength on the resulting samples was carried out in the same manner as in the above described examples. The results obtained on the samples are shown in Table 4.

Table 4

| | Sample | | | | |
|---|---|---|---|---|---|
| | 1 | 2 | 3 | 4 | 5 |
| Amount of Component (2) (g) | 0 | 2.5 | 5 | 15 | 25 |
| Ratio of Component (2) to Component (1) (% by weight) | 0 | 50 | 100 | 300 | 500 |
| Cross-cut Test | 0 | 5 | 10 | 10 | 10 |
| Stripping Test (g/mm) | 0 | 10 | 25 | 45 | 20 |

In Samples 3, 4 and 5, the resulting coating films do not result in curling and the surface property thereof is excellent.

While the invention has been described in detail and with reference to specific embodiments thereof, it will be apparent to one skilled in the art that various changes and modifications can be made therein without departing from the spirit and scope thereof.

What is claimed is:

1. A coating composition for a polyester resin which consists essentially of in an organic solvent (1) a cellulosic high molecular weight material and (2) an addition reaction product of at least one polyol having at least two hydroxyl groups and having 2 to 10 carbon atoms, and at least one diisocyanate having the general formula OCN —R —NCO, wherein R represents a divalent aliphatic or aromatic hydrocarbon group in an equivalent ratio of about 1:0.5 to 1:2 of the diisocyanate per hydroxyl group of the polyol, and wherein the ratio of component (2) to component (1) is about 10% to 500% by weight.

2. The coating composition of claim 1 wherein said organic solvent is selected from the group consisting of ethyl acetate, methanol, acetone, methyl ethyl ketone, methylene chloride and tetrahydrofuran.

3. The coating composition of claim 1, wherein said component (1) comprises at least one of nitrocellulose, cellulose acetate, or cellulose acetate butyrate.

4. The coating composition of claim 1, wherein said composition consists essentially of an organic solvent solution of said component (1) and said component (2).

5. A polyester coated article comprising a polyester resin film having thereon a layer of the coating composition of claim 1.

6. A method for improving the adhesion of a hydrophilic coating layer to a polyester resin film which comprises coating said polyester resin film with the coating composition as claimed in claim 1 prior to the coating of said hydrophilic coating composition.

7. The polyester resin article of claim 5, wherein said layer of said coating composition as claimed in claim 1 has a thickness on a dry basis of about 0.5 to 20 microns.

* * * * *